(12) United States Patent
Sherman et al.

(10) Patent No.: US 6,505,214 B1
(45) Date of Patent: Jan. 7, 2003

(54) SELECTIVE INFORMATION SYNCHRONIZATION BASED ON IMPLICIT USER DESIGNATION

(75) Inventors: Roman Sherman, Bellevue, WA (US); Peter M. Mansour, Seattle, WA (US); Chad A. Schwitters, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/407,543

(22) Filed: Sep. 28, 1999

(51) Int. Cl.[7] .............................................. G06F 17/30
(52) U.S. Cl. .......................... 707/201; 707/1; 707/8; 707/200; 707/203; 709/248
(58) Field of Search ....................... 707/1–10, 200–206; 709/248

(56) References Cited

U.S. PATENT DOCUMENTS

| | | | | | |
|---|---|---|---|---|---|
| 4,186,438 A | * | 1/1980 | Benson et al. | ............... | 364/200 |
| 5,729,735 A | * | 3/1998 | Meyering | ..................... | 707/10 |
| 6,052,735 A | * | 4/2000 | Ulrich et al. | ................ | 709/224 |
| 6,073,137 A | * | 6/2000 | Brown et al. | ................ | 345/835 |
| 6,125,369 A | * | 9/2000 | Wu et al. | ..................... | 707/10 |
| 6,205,448 B1 | * | 3/2001 | Kruglikov et al. | .......... | 707/200 |
| 6,272,545 B1 | * | 8/2001 | Flanagin et al. | ............ | 709/201 |
| 6,295,541 B1 | * | 9/2001 | Bodnar et al. | ................ | 707/10 |
| 6,324,544 B1 | * | 11/2001 | Alam et al. | .................. | 707/201 |
| 6,348,935 B1 | * | 2/2002 | Malacinski et al. | ......... | 345/840 |

* cited by examiner

*Primary Examiner*—Jean M. Corrielus
*Assistant Examiner*—Joon Hwan Hwang
(74) *Attorney, Agent, or Firm*—Merchant & Gould P.C.

(57) ABSTRACT

A device and method for synchronizing information between computer systems is provided. Certain subsets of information may be synchronized, while excluding other information from the synchronization process. The determination of the information subset to synchronize requires no explicit designation by the user. Instead, the subset of information to be synchronized is ascertained through actions of the user that implicitly indicate the user's interest in the information, allowing for an intuitive assumption of the user's synchronization desires, and requiring no user activity outside of the user's normal operational activity.

2 Claims, 11 Drawing Sheets

SELECTIVE INFORMATION SYNCHRONIZATION BASED ON IMPLICIT USER DESIGNATION

TECHNICAL FIELD

The present invention relates generally to the synchronization of information between computing systems. More particularly, the present invention relates to a system and method for judiciously synchronizing subsets of information between two computing systems, based on implicit perception of a user's desire to synchronize such information and without the need for explicit designation by the user.

BACKGROUND OF THE INVENTION

The information age has spawned a myriad of new electronic devices aimed at increasing efficiency, convenience, and ease of use. One such group of devices includes portable computing devices, personal digital assistants and other companion products that enable computer users to maintain access to digital information when away from the home or office computer.

In order to maximize usefulness, these products typically allow information to be transferred to and from other computers. These data transfers are generally accomplished by connecting the portable device to a target computer via a direct connection, modem connection, network connection or the like. The global proliferation of networks has advanced the desirability of these portable devices by allowing access to virtually any information that avails itself on the network, regardless of the user's whereabouts.

Further, certain information can be "synchronized" between the companion device and the user's primary computer to maintain data coherence between the two systems. Synchronization involves an electronic comparison and correlation of data between the companion device and the primary computer (such as a server or personal computer) to maintain data uniformity on both systems. The ability to synchronize changes on any or all systems makes portable computing devices powerful tools in the quest for immediate and accurate information access.

Despite the obvious benefits of these portable electronic devices, there are limitations on their use. For example, they have limited memory capabilities due to their relatively small size and low power consumption requirements. Further, connection costs may be based on connection time, and synchronization may prove expensive. Because these portable devices are typically connected to other computers or networks via modem, synchronization times may be significant due to speed limitations of modem technologies.

Technologies for synchronizing these companion devices with other computers generally involve synchronizing all information to which the companion device is capable of receiving. For example, synchronizing changes in e-mail folder hierarchies between a companion device and an office computer might involve synchronizing all folders in the hierarchy. This, however, may not be desirable. As previously indicated, the companion device has limited memory. It may prove wasteful of memory resources to synchronize all folders when the user is uninterested in certain folders in the hierarchy, since the companion device must increasingly allocate memory as the number of stored folders increases. Further, since the portable devices are generally used as companions to desktop or server e-mail systems, the user may only be willing to expend connection time and memory resources for the e-mail categories most important to the user. Full e-mail folder accessibility will always be available to the user at the user's primary computer.

One solution might be to require users to explicitly designate each and every category of information to be synchronized. In this way, not "all" information would be synchronized, and this could reduce connection times and memory allocation requirements. However, it may be unreasonable to expect users to specifically designate each and every such category. For example, a folder hierarchy may be configured to allow for thousands or tens of thousands of folders. It would be prohibitively time-consuming and aggravating for users to explicitly designate which of this multitude of folders should be, and continue to be, synchronized. This type of explicit designation would also require a manner in which the user could make selections, such as a graphical user interface (GUI) selection window. Availing such a GUI for use at the portable device would significantly increase the complexity of the interface software and is therefore not a satisfactory solution.

SUMMARY OF THE INVENTION

The present invention is generally directed to a manner of synchronizing information between computer systems, such as between client and server computer systems. The invention allows certain subsets of information to be synchronized, while excluding other information from the synchronization process. In accordance with the invention, the determination of which information subset is to be synchronized does not require explicit designation by the user. Rather, the information to be synchronized is ascertained through actions of the user that implicitly indicate the user's interest in that information, thereby allowing for the intuitive "assumption" that the user would want that information synchronized. Therefore, no action other than the user's normal activity in connection with the computer system is required to identify items for synchronization.

One aspect of the invention allows subsets of an object set to be synchronized between multiple computing systems. The object set is a set of certain information items, such as folders in an e-mail folder hierarchy. Predetermined user actions that implicitly reveal the user's desire to synchronize certain objects are defined. When the user, during normal operation of one of the computing systems, performs an action corresponding to one of the predetermined user actions, a synchronization indicator is assigned to the object or objects associated with this implicit synchronization directive. Only objects belonging to the subset of objects that have been assigned a synchronization indicator are synchronized, to the exclusion of other objects in the object set.

The intuitive characteristic of the invention's selective synchronization process can be applied to a wide variety of synchronizable information. One aspect of the invention includes applying the selective synchronization process to an e-mail folder hierarchy. The subsets of the e-mail folder hierarchy are synchronized between computing systems, such as a server and a client or "companion" device. Predetermined user actions that implicitly demonstrate the user's desire to synchronize particular folders of the hierarchy are defined, and when the user performs one of these predetermined actions, those particular folders are flagged as part of the subset of folders to be synchronized between the server and client. In this manner, only the folder subset that is determined by one of these actions to be of interest to the user, rather than the entire folder hierarchy, is synchronized. This is accomplished without requiring the user's explicit identification of the subset of folders to be synchronized.

Another aspect of the invention relates to an apparatus equipped to synchronize subsets of an e-mail folder hierarchy between server and client computing systems. The apparatus includes a module for defining predetermined user actions that implicitly demonstrate the user's desire to synchronize certain folders of the hierarchy. A monitor module monitors both the predetermined user actions and actual actions taken by a user of the client system, and a synchronization assignment module assigns synchronization identifiers to those folders implicitly identified for synchronization via a match of the predetermined and actual user actions. A synchronization module synchronizes the subset of e-mail folders having been assigned a synchronization identifier.

DETAILED DESCRIPTION OF THE INVENTION

The present invention is generally directed to a manner of judiciously synchronizing subsets of information between two systems, based on implicit perception of a user's need to synchronize such information and without the need for explicit designation by the user. Where two or more independently-operable computing devices are connected to communicate data between the devices, certain data may be synchronized among the devices to maintain its conformity at each of the devices. However, all of the data that "may" be synchronized does not necessarily "need" to be synchronized. Through the user's usage activity or other heuristic patterns of use, the present invention ascertains the user's relative interest in certain subsets of information, and facilitates synchronization of those information subsets that appear to be of interest to the user. Other information is not synchronized until the user shows some "interest" in that information, at which time it will be deemed worthy of synchronization. The decision as to which information is to be synchronized is accomplished without the need for explicit user designation, and instead is determined through ordinary operation actions of the user.

Figure 1:
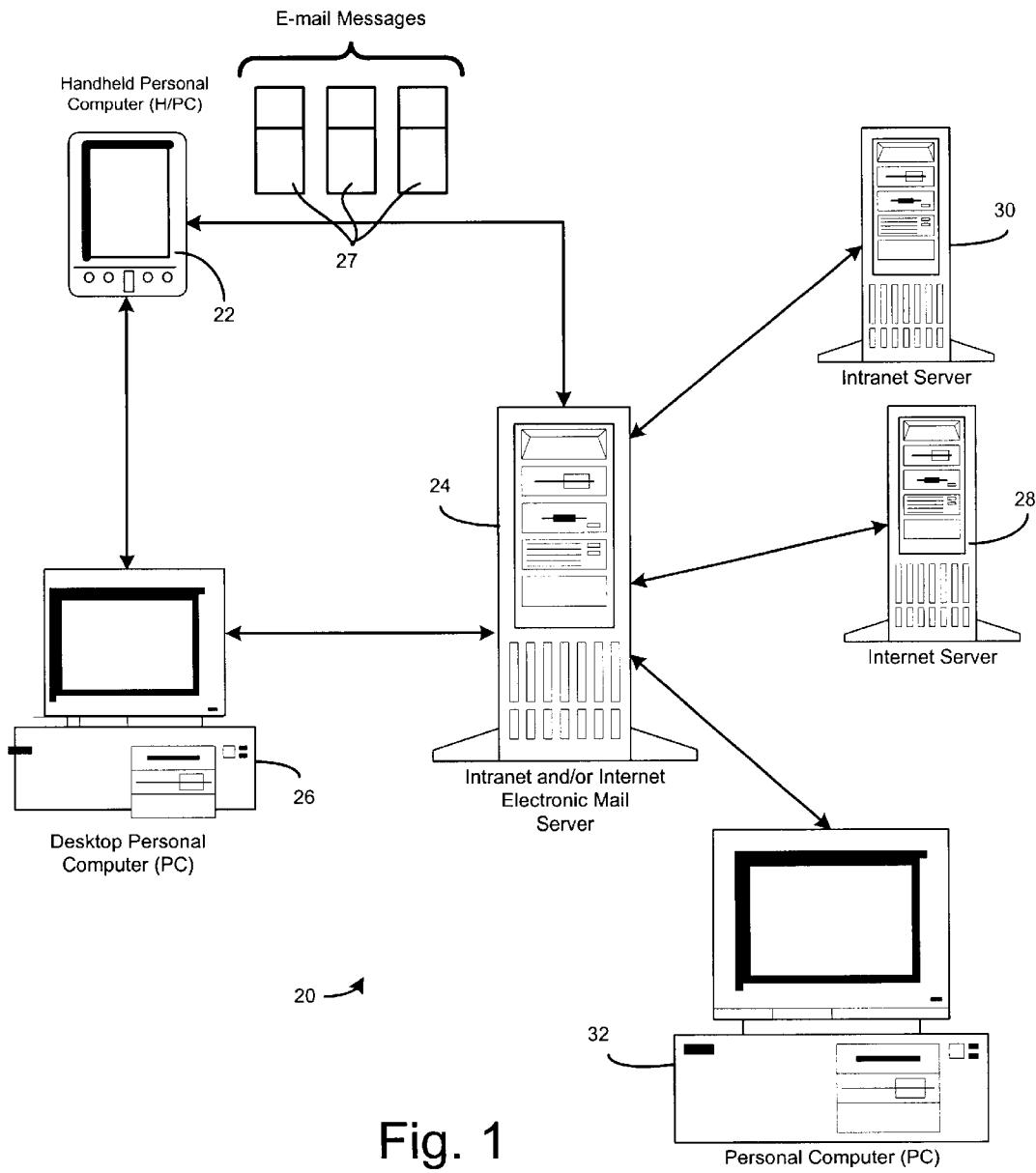
FIG. 1 is a pictorial representation of an example client/server computer network environment in which the principles of the present invention may be applied.

In order to describe the present invention, example environments in which the invention may be employed are described in connection with FIGS. 1–3. FIG. 1 illustrates an example client/server network environment in which the principles of the present invention may be applied. The client/server network system 20 includes a client computer system 22 that may be connected to a server computer system 24. In one embodiment, the client computer system 22 is a portable hand-held computer operating under the control of an operating system capable of carrying out the present invention. Examples of portable computers in which the present invention may be implemented include those that are commercially available as Handheld PCs (or H/PCs), Palm-size PCs, and the like. The present invention is described in connection with handheld or other portable computers, as the invention is particularly useful when used in connection with these devices. However, the invention may be used in connection with other computing devices requiring synchronization, as will become readily apparent to those skilled in the art from the ensuing description of the invention.

The H/PC 22 may also be connected to a desktop personal computer (PC) 26 as a companion device, which in turn may be connected to the server 24. The server 24 represents a computing system capable of managing network traffic spanning various geographic areas (e.g., local, wide and global area networks) or operating under any particular network configuration. In the example of FIG. 1, the server 24 operates as an Internet server and/or an Intranet server to send and receive electronic items such as electronic mail messages (e-mail) 27. These electronic items may be routed through various connections or gateways to other computer systems such as an Internet e-mail server 28, an Intranet server 30 and/or another desktop PC 32. The server 24 receives e-mail messages from the other computing systems 28, 30 and 32 and stores these e-mail messages for the user of the H/PC 22 and the PC 26 in an account dedicated to that user.

The e-mail server communicates with the various computers 22, 26, 28, 30 and 32 using specific protocols, i.e., rules governing the type and form of communications. The e-mail server may communicate with the handheld computer 22 using, for example, the Post Office Protocol (POP), the Internet Message Access Protocol (IMAP), or some other message transport protocol. POP is relatively rudimentary and offers few operational features to the user. IMAP offers more features related to the communication between a client device and the network server device. POP and IMAP protocols are considered message receipt protocols used to allow a remote or companion device to receive messages, while the Simple Mail Transfer Protocol (SMTP) is an example of a protocol used to communicate messages from the remote or companion device to the server. The present invention may be used in connection with various transfer protocols, and while some embodiments are generally described in connection with IMAP, the folder synchronization embodiment of the invention is applicable to any transfer protocol supporting hierarchies of folders.

The handheld computer 22 includes a messaging system that receives and stores server-based items, such as the e-mail messages 27. These server-based items are stored in a hierarchy of folders, where each top-level folder of the hierarchy is associated with the user account on the server that provides the corresponding server-based items. The messaging system is capable of handling messages in flat folder storage architectures as well as the newer hierarchical folder storage architectures.

Figure 2:
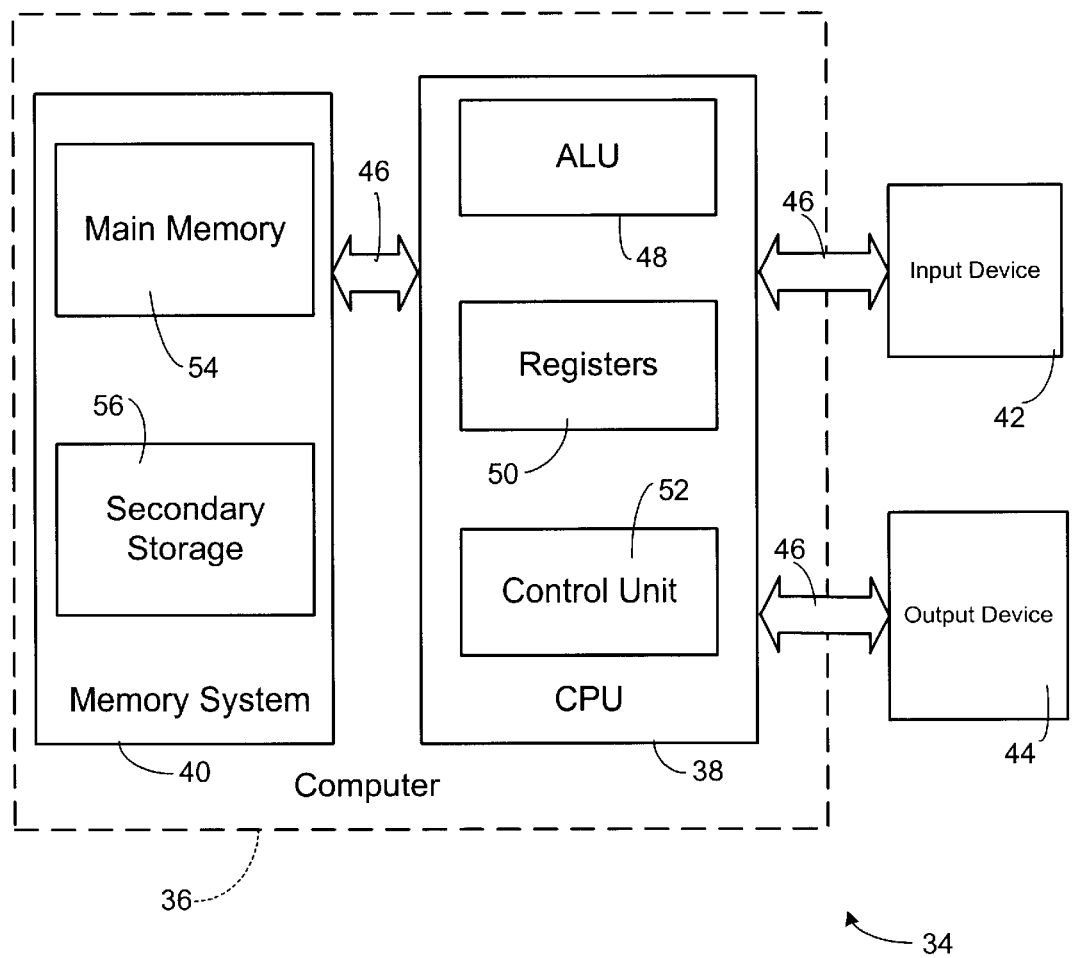
FIG. 2 shows one embodiment of a handheld computer (H/PC) system that may be used in connection with the present invention.

FIG. 2 provides a general description of an example computing environment in which the invention may be implemented. Various embodiments of the invention may be implemented by executing program instructions in this type of computing environment, such as the H/PC 22. Those skilled in the art will appreciate that the invention may be practiced with other computer system configurations, such as laptop PCs, desktop PCs, multiprocessor systems, microprocessor-based or programmable consumer electronics, network PCs, mini-computers, mainframe computers, and so forth.

The computing system 34 (e.g., H/PC) illustrated in FIG. 2 includes a computer 36 having at least one central processing unit (CPU) 38 with a memory system 40, an input device 42, and an output device 44. These elements are coupled by at least one system bus 46. The system bus 46 may be any of several types of bus structures such as a memory bus, a peripheral bus or a local bus using any of a variety of bus architectures. The CPU 38 is of familiar design and includes an Arithmetic Logic Unit (ALU) 50 for performing computations, a collection of registers for temporary storage of data and instructions, and a control unit 52 for controlling operation of the system 34. The CPU 38 may be a microprocessor having any of a variety of architectures including, but not limited to those architectures currently produced by Intel, Cyrix, AMD, IBM and Motorola.

The system memory 40 includes a main memory 54, which may include both volatile and non-volatile memory, such as random access memory (RAM) and read-only memory (ROM). The system memory 40 may also include secondary storage 56 in the form of long-term storage mediums such as hard disks, floppy disks, tape, compact disks (CDs), flash memory, and other devices that store data using electrical, magnetic, optical or other recording media. The main memory 54 may also include video display memory for displaying images through the output device 44, such as a display device. The memory can comprise a variety of alternative components having a variety of storage capacities such as magnetic cassettes, memory cards, video digital disks, Bernoulli cartridges, random access memories, read-only memories and the like may also be used in the exemplary operating environment. Memory devices within the memory system and their associated computer readable media provide non-volatile storage of computer readable instructions, data structures, programs and other data for the computer system.

The input devices may include a keyboard, a mouse, a microphone, a touch pad, a touch screen, voice-recognition system, etc. The output devices may include a display, a printer, a speaker, a touch screen, etc. Some devices, such as a network interface or a modem can be used as input and/or output devices. The input and output devices are connected to the computer through system buses 46.

The computer system further includes an operating system and usually one or more application programs. The operating system comprises a set of programs that control the operation of the system 34, control the allocation of resources, provide a graphical user interface to the user and includes accessory and utility programs. An example of an operating system that can run on the handheld computer is the "WINDOWS CE" operating system, which also is commercially available from Microsoft Corporation. An application program is software that runs on top of the operating system software, and uses computer resources made available through the operating system to perform application-specific tasks desired by the user. While the present invention may be integrated into the operating system software, a preferred embodiment provides for its implementation in an application program as described more fully in connection with FIG. 3 below.

Figure 3:
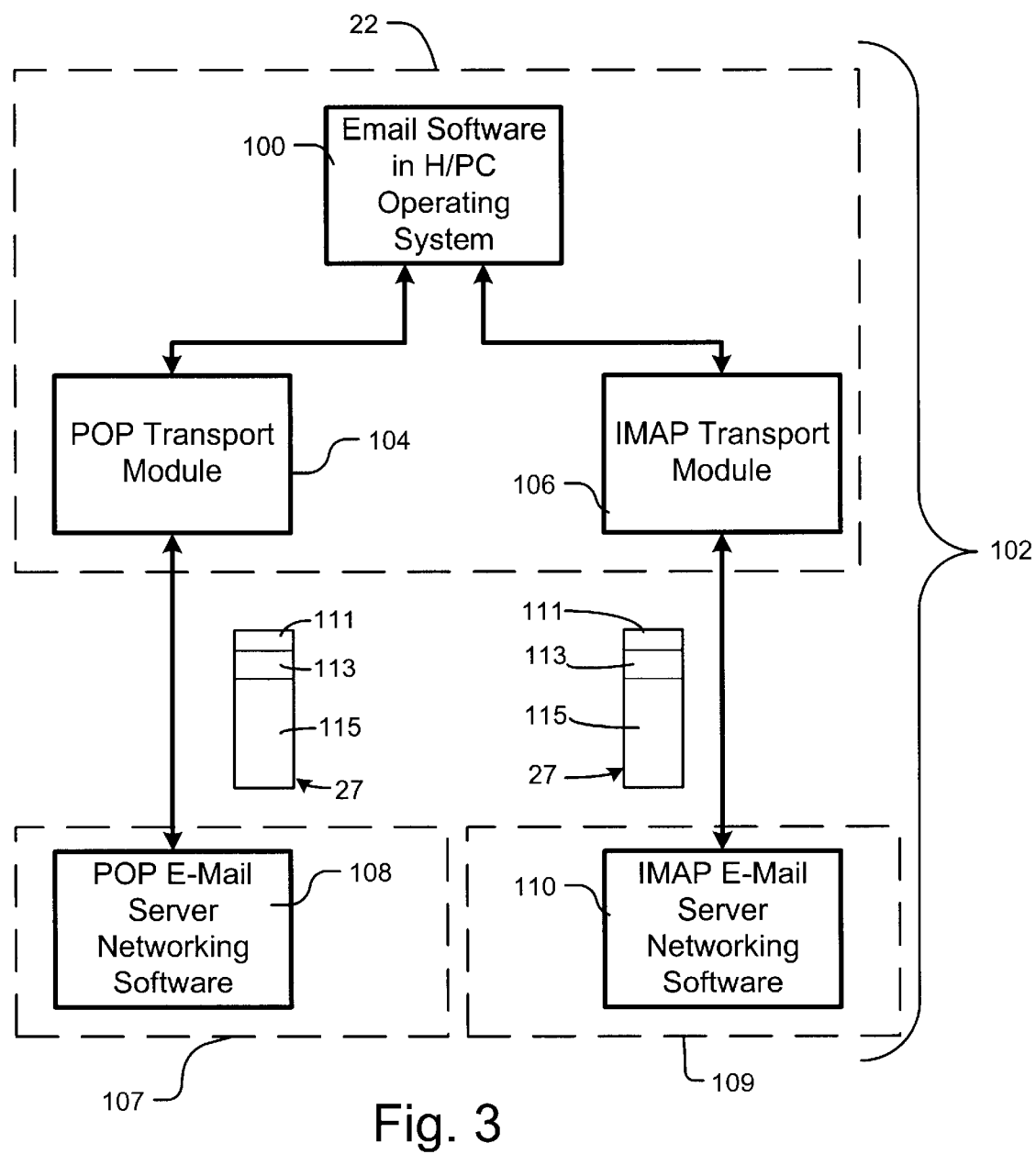
FIG. 3 shows one embodiment of a client/server software environment that includes e-mail software and transport modules capable of use in connection with the present invention.

FIG. 3 illustrates a software interface between the operating system and application programs and modules, in accordance with one embodiment of the present invention. In this embodiment, the e-mail software 100 is an application program that runs on top of an operating system 101, such as the Microsoft "WINDOWS CE" operating system used with the H/PC 22. The e-mail software 100 works directly with communication software known as transport modules. In the illustrated embodiment, one module is a POP transport module 104, and another is an IMAP transport module 106. The POP transport module 104 is a network communications layer designed specifically to communicate with POP communications software 108 located on a POP e-mail server 107. POP server 107 represents a particular embodiment of the server 24 described in connection with FIG. 1. Alternatively, the e-mail software 100 communicates with the IMAP transport module 106, which is a network communication layer designed to communicate with IMAP software 110 on the IMAP e-mail server 109. IMAP server 109 represents another embodiment of the server 24. Depending on whether the H/PC 22 is configured to communicate with server 107 or 109, transport module 104 or 106 is used. The user configures the H/PC 22 to communicate based on the user's particular e-mail account and the protocol employed by the e-mail server. However, with respect to the e-mail software 100, the requests, commands and responses are the same regardless of which transport module (104 or 106) is used.

The e-mail software 100 sends command requests to the transport module 104 or 106 requesting that actions be performed by the server 107 or 109. Such actions might be to return server-based items such as e-mail messages. When a request is received by the module 104 or 106, the module 104 or 106 converts the command into data signals that are sent to the e-mail server 107 or 109 over the network connection. The e-mail server 107 or 109 and its networking software 108 or 110 receives these data signals, compiles the signals, analyzes the signals and performs the requested operations in response to the signals. Once the server 107 or 109 performs the operations, the server returns information to the transport module 107 or 109 either acknowledging the operation was completed successfully, or that an error occurred.

The response from the server also includes data requested by the software 100. The response is in the form of data signals that are sent to the module 104 or 106. Module 104 or 106 in turn compiles the data signals into a meaningful response for transport to the e-mail software 100. The software 100 can then parse and use the response accordingly.

The subjects of the requests from the software 100 to the server 107 or 109 relate to e-mail messages 27 (FIG. 1). Each e-mail message 27 is an electronic document that is made up of at least three elements: an identification element (ID) 111; header information 113; and a message body 115. The ID 111 is used internally by the handheld computer 22 or the server 24 to identify the file. It may be a simple identifier such as an integer, or may be more complex such as a file name or other ID string. The header 113 includes information regarding the e-mail message 27, such as the originator, addressee, creation time, and message subject. The header 113 may include other informational fields relating to the data or management thereof. The body 115 is the actual message created by the message originator, and may include text, graphics, other files or attachments.

In the following description, the logical operations of the various embodiments of the invention described herein may be implemented in a variety of manners, including a sequence of computer implemented steps running on a computing system, and/or interconnected machine modules within the computing system. The particular implementation used is a matter of choice dependent on the performance requirements of the hand-held computer and/or the server. Accordingly, the logical operations making up the embodiments of the invention are referred to alternatively as operations, steps or modules.

Figure 4:
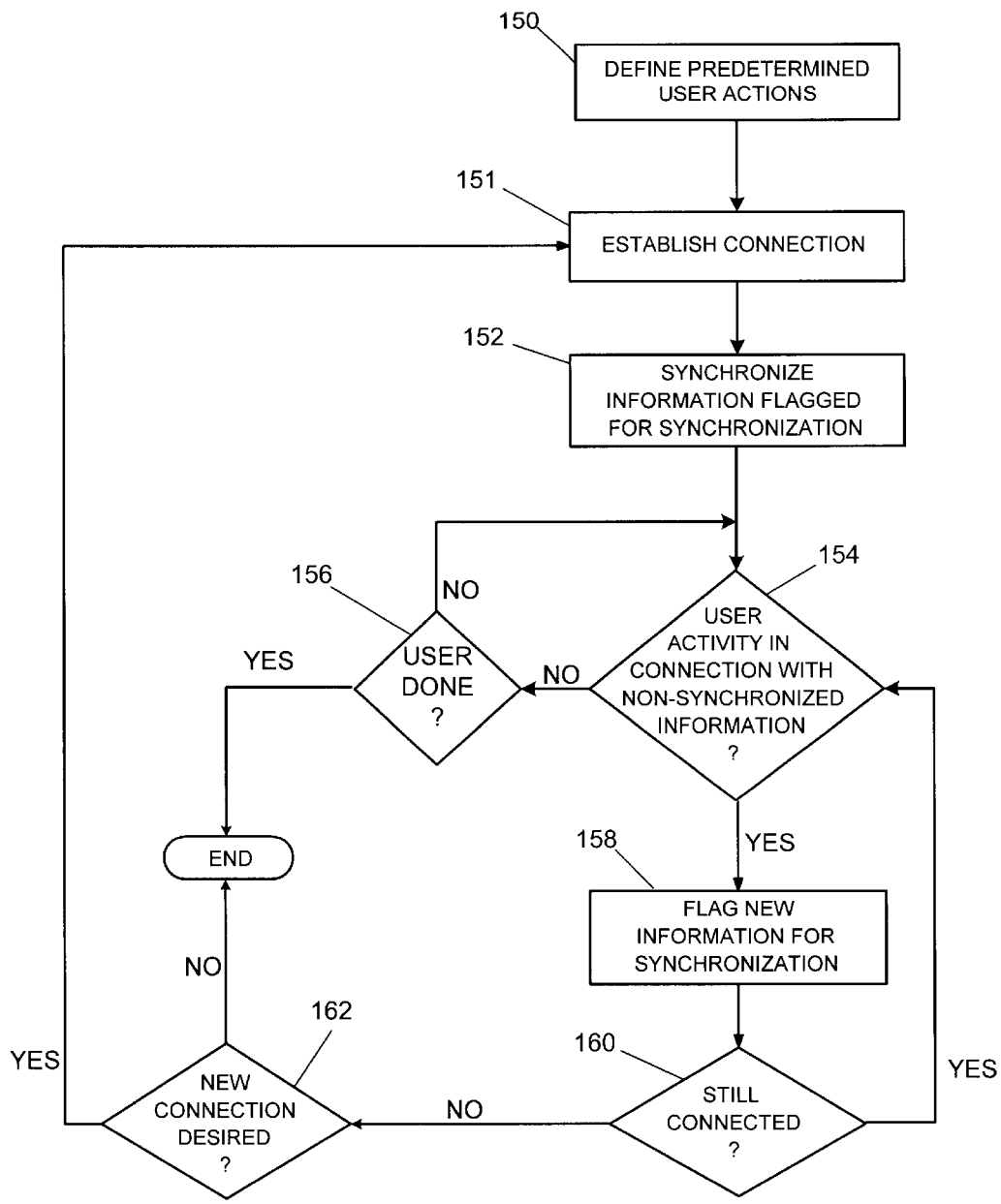
FIG. 4 is an operation flow diagram illustrating one manner of selectively synchronizing information subsets in accordance with the principles of the present invention.

FIG. 4 is an operations flow diagram illustrating one manner of selectively synchronizing information subsets in accordance with the principles of the present invention. Predetermined user actions are defined by activity definition module 150, which is implicitly indicative of the user's interest in certain information. For example, in the context of an e-mail folder hierarchy synchronization, a predetermined user action may be defined as an attempt to view subfolders of a particular folder. Connection operation 151 establishes a connection between the devices to be synchronized, such as a server and a companion device. Information already flagged for synchronization on one device, such as the companion device, is synchronized by operation 152 between the server and companion device. Monitor module 154 monitors predetermined user activity in connection with information that has not yet been synchronized to detect user activity on such information. Where no predetermined user activity that might reveal the user's interest in certain information is found, no further synchronization action is taken. In this event the operation flow branches NO to decision operation 156. Operation 156 determines whether or not the user has completed handheld computer use. If the user has completed handheld computer use, processing ends. However, during use of the companion computing device, user activity is continually monitored by monitor module 154 to determine whether one or more of the predetermined user activities is encountered.

The predetermined user activities detected by monitor module 154 relate to normal operation of the handheld computer or companion device that reveals enough user interest in the information to warrant synchronization of that information. For example, a predetermined user activity can be expanding an e-mail folder to view its subfolders. The user's expansion of the part of the folder hierarchy descending from a given folder implicitly reveals the user's interest in the subfolders of this folder. In accordance with one embodiment of the present invention, this user action would trigger relatively immediate retrieval and subsequent synchronization of the expanded e-mail subfolders. Until the user expanded the folder, no such synchronization would occur. Another predetermined user activity might include viewing the file list in a certain file directory, such as a "My Documents" file directory. Viewing this file list would trigger relatively immediate retrieval and subsequent synchronization of the file list. These "viewing" actions taken by the user indicate an implicit interest of the user in this information, thereby prompting synchronization of that subset of information.

In a preferred embodiment, the information (e.g., subfolders of an expanded folder) get downloaded to the device when a user expands the folder, but the information is not synchronized at that time. Instead, the subfolders of interest are marked for synchronization and will be synchronized on subsequent connections. The difference between downloading the subfolders and synchronizing them is that any changes previously made on the companion device to the subfolder list in question do not get propagated to the server during the download operation, but those changes are propagated to the server during synchronization. As an example, during an offline session, a user may create a subfolder of a folder that has not been previously expanded. Next, the user connects to the server and expands that folder causing subfolders of this folder existing on the server to be downloaded to the device. However, the subfolder that was created on the device won't be propagated to the server until the next connection procedure.

Where a particular user activity is recognized by module 154, the information associated with that activity is therefore flagged for synchronization by assignment operation 158. In one embodiment of the invention, a synchronization flag is set by operation 158 in the database storing that information. If the connection is still established between the server and companion device as determined by decision operation 160, processing returns to user activity module 154. Alternatively, processing may return to synchronizing operation 152 where the information is synchronized. If the companion device is no longer electronically connected to the server, operation 162 tests whether a new connection is desired. If a new connection is desired, the operation flow returns to connection operation 151. A connection will again be established and all information flagged for synchronization will be synchronized—including the new information flagged for synchronization during the last connection. In this manner, information that is not of particular interest to the user will not consume additional connection time and companion device memory since it will not be synchronized.

Figure 5:
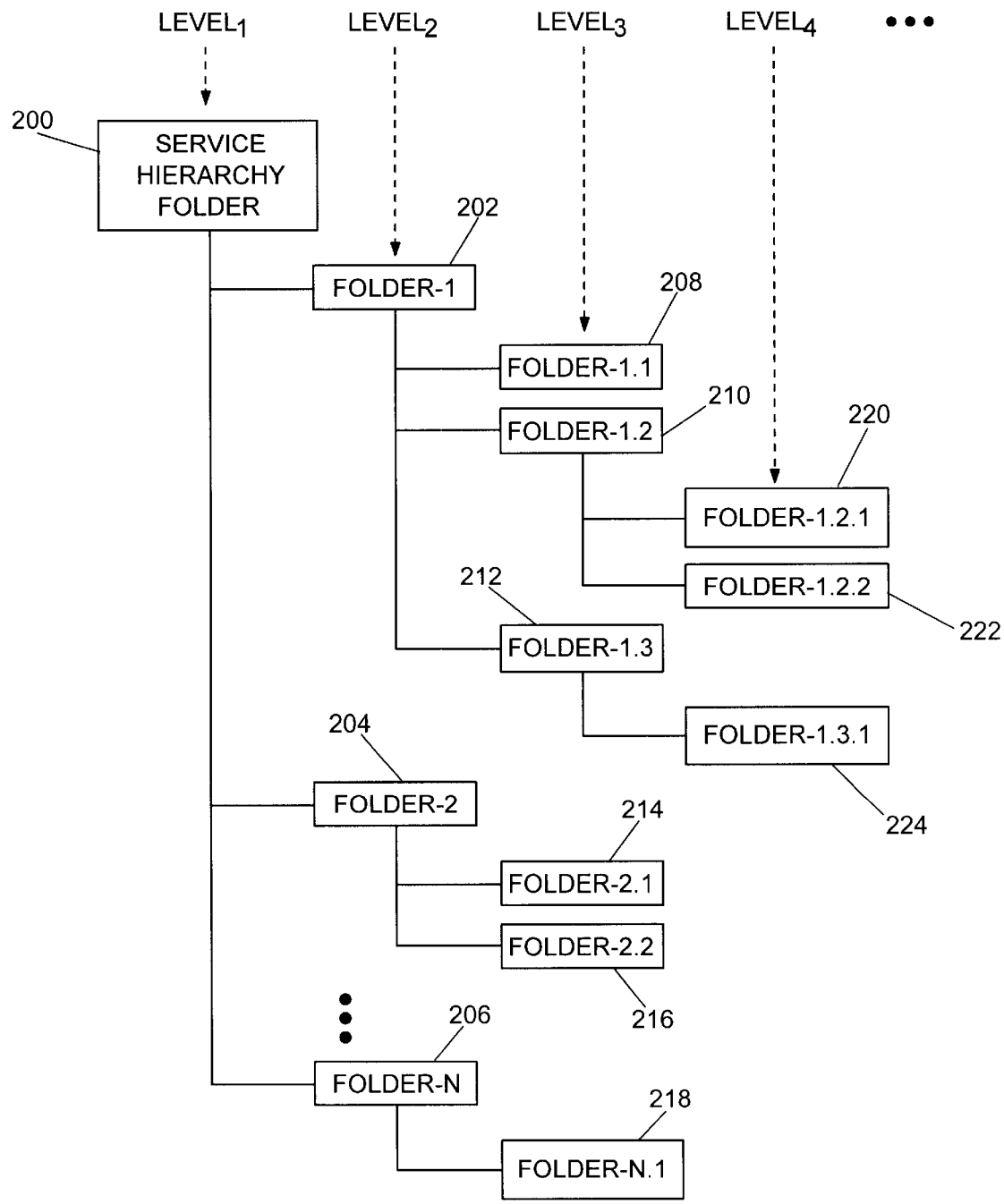
FIG. 5 illustrates an example of an e-mail folder hierarchy in which e-mail messages may be organized.

In accordance with one embodiment of the invention, the companion device is a handheld computer that functions as an e-mail client, which facilitates e-mail operations such as sending, receiving and organizing electronic mail messages. FIG. 5 illustrates an example of an e-mail folder hierarchy in which e-mail messages may be organized at the server. As will be described in greater detail below, subsets of such a hierarchy can be synchronized to reside on the companion device in accordance with the principles of the present invention.

Referring now to the example folder hierarchy of FIG. 5, a service hierarchy folder, labeled Service Hierarchy Folder 200, represents a root or top-level folder. Each service through which the handheld computer can connect to the server will have its own hierarchy. For example, for a particular connection, the Service Hierarchy Folder 200 would be labeled as a "Service Name" folder. Some transports may be grouped together into a single service hierarchy folder, such as one labeled "Mailbox". subfolders, shown as Folder-1 202, Folder-2 204 through Folder-N 206 at $Level_2$ of the folder hierarchy. In this example, each of the folders 202, 204, 206 have associated subfolders at $Level_3$, including Folder-1.1 208, Folder-1.2 210, and Folder-1.3 212 as subfolders of Folder-1 202; Folder-2.1 214 and Folder-2.2 216 as subfolders of Folder-2 204; and Folder-N.1 218 as a subfolder of Folder-N 206. Similarly, $Level_4$ subfolders include Folder-1.2.1 220, Folder-1.2.2 222, and Folder-1.3.1 224. The folder hierarchy may contain further hierarchy levels as defined by the user.

The folder hierarchy illustrated in FIG. 5 represents a typical hierarchy that is created by the user on a server or desktop computer. When the user connects a companion device (such as an H/PC) to the server or desktop computer, a subset or the entire set of folders may be synchronized between the two systems. In order to identify which folders are to be synchronized, a flag or electronic code is set on a parent folder. That is, an "expanded" flag, which is set on a folder, pertains to the subfolder list of that folder and means that its subfolders will be synchronized. In this manner, the subfolders themselves are not necessarily individually marked in any way.

Folders that are synchronized are thereby made available on the H/PC. The synchronization process also makes sure that any changes made to that folder list on either the device or the server are reconciled. As an example, a creation or deletion of a folder on the device while the device was offline would be propagated to the server during synchronization. In the same way, creation or deletion of folder on the server would be propagated to the device during synchronization. Preferably, the synchronization process also synchronizes any folder rename operations. Moreover, other folder operations may be reconciled during the folder list synchronization.

Figure 6:
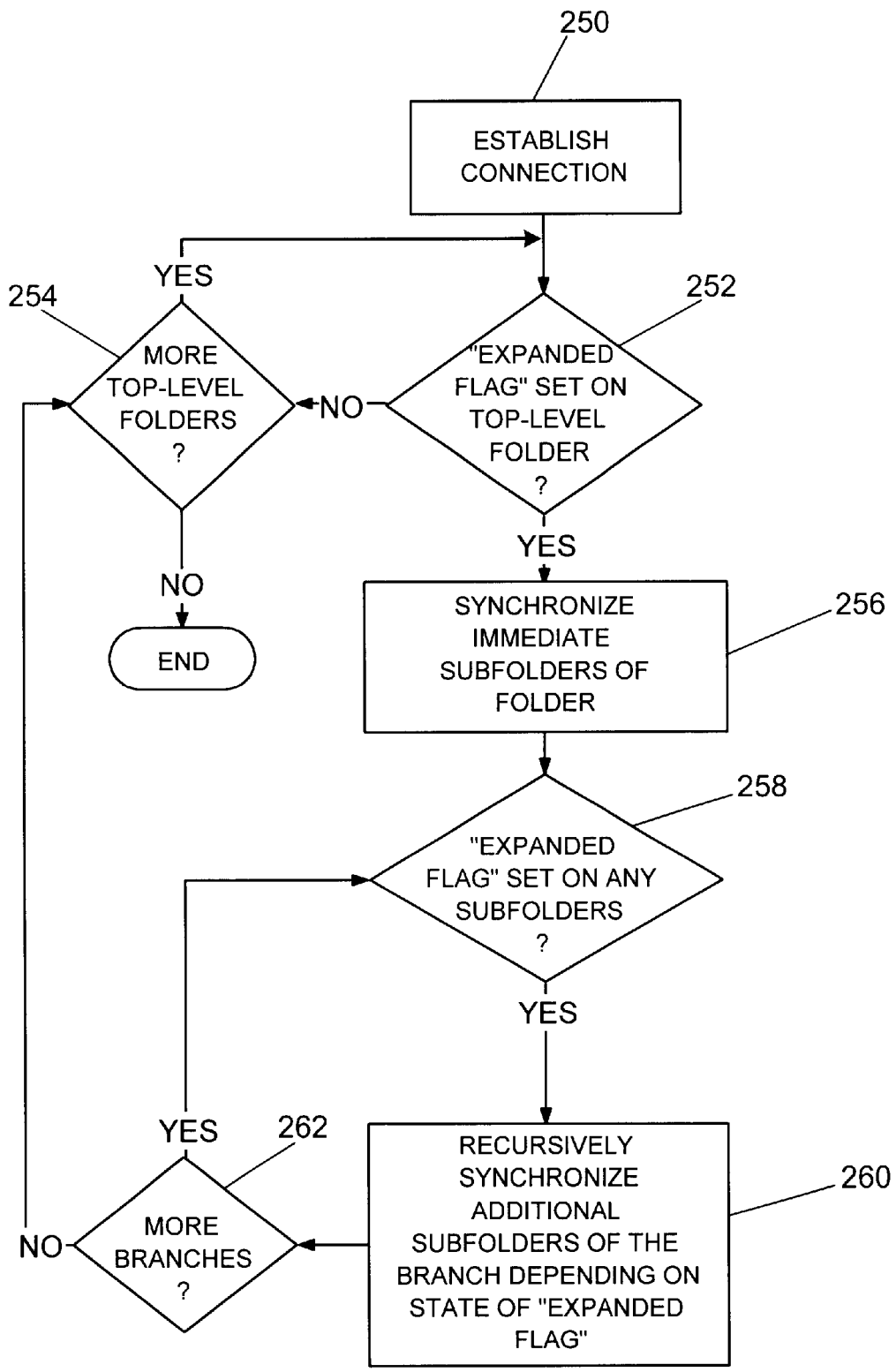
FIG. 6 shows logical operations of one embodiment for recursively synchronizing a subset of folders in an e-mail folder hierarchy in accordance with the present invention.

FIG. 6 is an operation flow diagram illustrating one embodiment for synchronizing a subset of folders in an e-mail folder hierarchy in accordance with the present invention. A connection operation 250 establishes the connection between the H/PC and the server or other primary computer. An "expanded flag" is set, as described hereinafter, in the H/PC folder database for each folder whose subfolder list is to be synchronized, and it is this "expanded flag" that is monitored by monitor operation 252 in FIG. 6. The presence of an asserted expanded flag on a top-level folder is detected by monitor operation 252. The flag can be "set" to any binary value, code, or other indicator, and in one embodiment, the "flag" is a binary value, which is set to a predetermined state when synchronization is to take place.

If the expanded flag is not set, operation flow branches NO to decision operation 254 where it is determined whether there are more top-level folders. In one embodiment, there is only one top-level folder, and the expanded flag is set by default. Where it is found that the expanded flag associated with the top-level folder is set, synchronization of the subfolders of the top-level folder is initiated at synchronization operation 256. This results in providing the H/PC user a folder hierarchy on the H/PC that includes the top-level folder and the immediate subfolders of that folder. For example, referring briefly to FIG. 5, the Level$_1$ Service Hierarchy Folder 200 corresponds to the top-level folder, and Folders 202, 204 and 206 correspond to the immediate subfolders that will be synchronized. If the only expanded flag set was for the Service Hierarchy Folder 200, the H/PC would synchronize Folders 202, 204 and 206, but would not synchronize folders at subsequent levels (i.e., Level$_3$, Level$_4$, etc.).

Returning now to FIG. 6, decision operation 258 checks each of the subfolders to determine the state of the expanded flag. For each of the expanded flags set, the operation flow branches YES to synchronization module 260. Each of the subfolders in that particular branch are recursively synchronized by module 260. For example, if at decision operation 258 it is determined that "expanded" flag is set on Folder-1 202 of FIG. 5, the Level$_3$ Folders 208, 210 and 212 that are immediate subfolders of Folder-1 202 will be synchronized. The recursive process continues down the branch associated with Folder-1 202 to Level$_4$, and further, if necessary, to synchronize all subfolders of the folders having an expanded flag set. When the folder branch has been synchronized in accordance with the state of the expanded flags, processing continues to branch test operation 262. Operation 262 tests for more branches. If there are more branches, testing of the expanded flag at operation 258 and the resultant synchronization at module 260 continues. The More Branches operation 262 is used to illustrate the recursive nature of the synchronization operation. In essence, the process must call itself to determine whether more subfolders are to be synchronized depending on the state of the expanded flags. If more branches are detected at 262 that require synchronization as determined at 258 then process must flow to the synchronization stage 260. If there are no more branches to consider, the operation flow returns to decision operation 254.

A mail store is provided in the H/PC, and includes two separate databases: a message database, and a folder database. These two databases house the data records representing both the message and folder data within the user-defined, hierarchical folder architecture. In one embodiment of the invention, the expanded flag represents a field of the folder database in each database record. This field is then monitored in each record to determine the state of the expanded flag associated with the corresponding folder. Testing of this folder database field is represented by decision operations 252 and 258 of FIG. 6. As more folders are synchronized, additional records are accordingly generated in the folder database. As will be appreciated by those skilled in the art, other manners of storing the expanded flag other than via a database field are possible, including mapped memory structures or other addressable storage structures whereby stored expanded flag indicators can be located.

Figure 7:
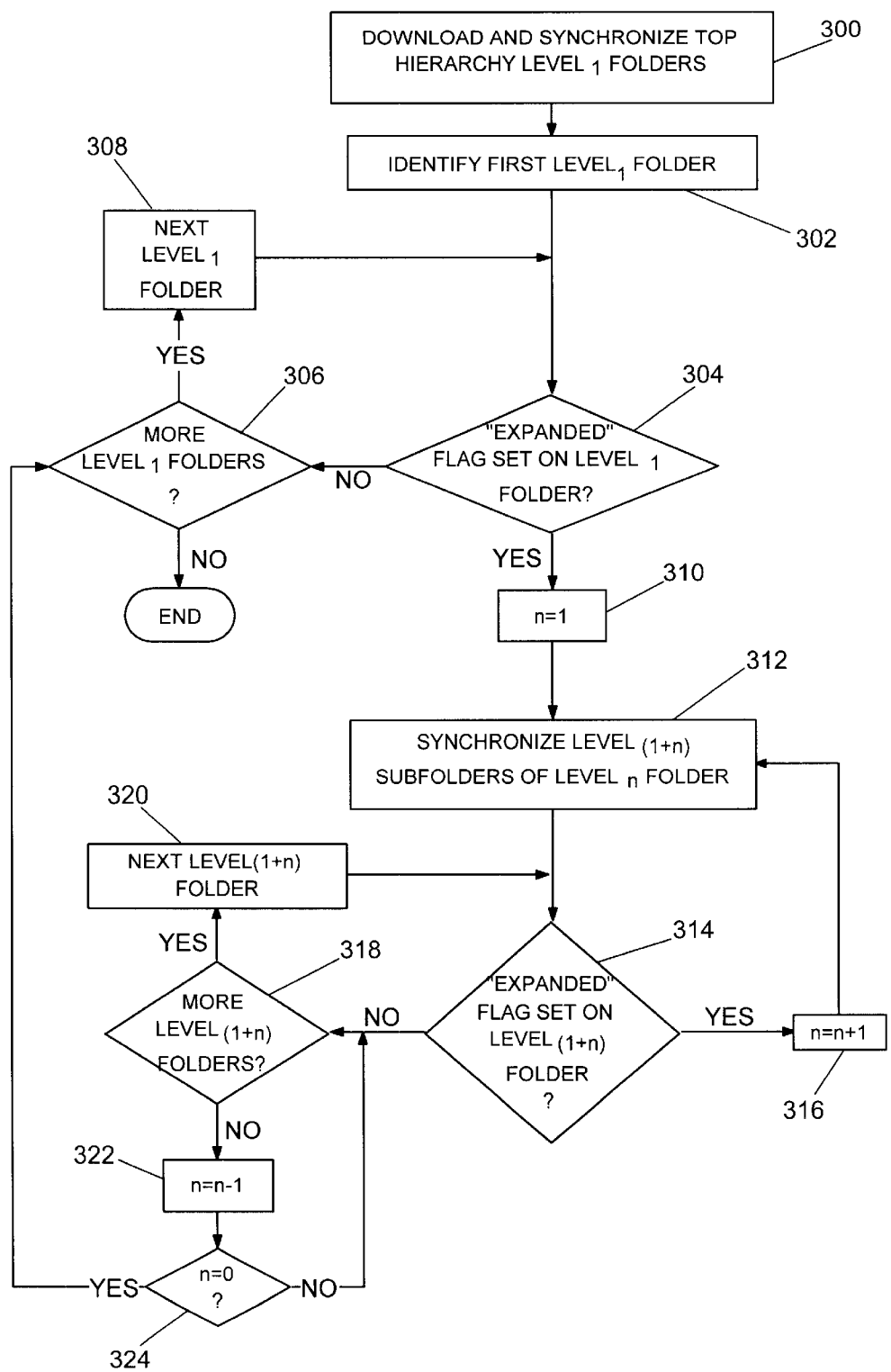
FIG. 7 is a flow diagram of one embodiment of a recursive method for synchronizing a subset of folders in an e-mail folder hierarchy in accordance with the invention.

FIG. 7 is an operational flow diagram of another embodiment for recursively synchronizing a subset of folders in an e-mail folder hierarchy. In this example, the top-level hierarchy, Level$_1$, represents the service hierarchy folder for the particular service provider. As depicted by module 300, these one or more Level$_1$ folders are set by default to be downloaded and synchronized to the H/PC from the server so that the H/PC user has an initial view of the e-mail folder hierarchy. In one embodiment of the invention, only one top-level folder will be considered at a time, because each top-level folder corresponds to a particular service and the H/PC will typically be connected to only one server at a time. In this case, the identification of the first Level$_1$ folder shown at operation 302 merely requires identifying the top-level folder associated with the particular service connection. This, however, is not a requirement of the invention. Multiple top-level folders may be used, and could even be communicating with multiple servers in a multi-tasking fashion such that multiple top-level folders are synchronized. It is in this context that the method of FIG. 7 will be described, with the understanding that there may be only one Level$_1$ folder to be synchronized during a particular connection.

In alternative embodiments, some or all Level$_1$ folders may not exist on the server and may instead be created on the companion device to unify folder hierarchies from several services into a single hierarchy. In such an embodiment, operation 300 may not be needed.

When the first (or only) Level$_1$ folder has been identified, operation 304 examines the expanded flag associated with the folder to determine whether the expanded flag is set. In one embodiment of the invention, the expanded flag is set by default on all top-level folders to automatically synchronize the next level of folders, such as the Level$_2$ folders depicted in FIG. 5. For embodiments where the expanded flag is not set by default, and the expanded flag has not been set by other means, it is determined at decision operation 306 whether there are more Level$_1$ folders to be considered. If so, the next Level$_1$ folder is considered at operation 308, and the operational flow continues. If there are no other Level$_1$ folders, the synchronization operation terminates.

Where the expanded flag is set on the Level$_1$ folder, the immediate "children" of that "parent" folder are synchronized by the operation flow path starting at operation 310. The logical operation 310 sets n=1, and operation 312 synchronizes the Level$_{(1-n)}$ subfolders of the Level$_n$ folder. Where n=1, this results in synchronizing the Level$_2$ subfolders of the Level$_1$ folder. For example, referring briefly to FIG. 5, an expanded flag set on the Level$_1$ Service Hierarchy Folder 200 results in the synchronization of Folder-1 202, Folder-2 204 through Folder-N 206 which are Level$_2$ folders. It should be noted that the variable n is used here for purposes of description of the recursive process in FIG. 7, and that the particular implementation need not necessarily assign and manipulate such a variable.

When the Level$_2$ folders have been synchronized, it is determined at decision operation 314 whether the expanded flag is set on a first one of the Level$_{(1+n)}$ folders, which in this case will be the Level$_2$ folders. If the expanded flag is set on that particular Level$_2$ folder, the immediate children of that parent folder are synchronized. This is depicted in the operation flow diagram by incrementing n in operation 316, and synchronizing the Level$_{(1-n)}$ subfolders of the Level$_n$ folder at operation 312. Because n was incremented at block 316, this results in synchronizing the Level$_3$ subfolders of the Level$_2$ folder. For example, referring again to FIG. 5, an expanded flag set on the Level$_2$ Folder-1 202 results in the synchronization of Folder-1.1 208, Folder-1.2 210 and Folder 1.3 212 which are Level$_3$ folders. This top-down synchronization process continues upon continued recognition of set expanded flags, as can be seen by the looping flow of operations 312, 314 and 316.

When it is determined at decision operation 314 that an expanded flag associated with a particular folder is not set, the children of that folder are not synchronized, which is illustrated by the operation flow branches NO to operation 318. For example, assume that at a given instant n=2, and it is determined at decision block 314 that the expanded flag is not set on a first Level$_3$ folder (e.g., Folder-1.1 208). In this case, the synchronization step 312 is not reached, and instead processing proceeds to decision operation 318 where it is determined whether there are more folders at that level, e.g., Level$_e$ in this example. If so, the next Level$_3$ folder is considered as indicated at operation 320, and its expanded flag is examined at decision operation 314.

When all of the folders at a particular folder hierarchy level have been examined for the presence of a set expanded flag as determined at decision operation 318, n is decremented by operation 322. If n is equal to zero as determined at decision operation 324, it indicates that all folder levels below Level$_1$ have been synchronized in accordance with the state of the expanded flags, and processing continues to decision operation 306, which determines whether any further Level$_1$ folders exist. If n has not been decremented to zero, the recursive process continues until all folders have been synchronized where required by their associated expanded flags.

Figure 8A:
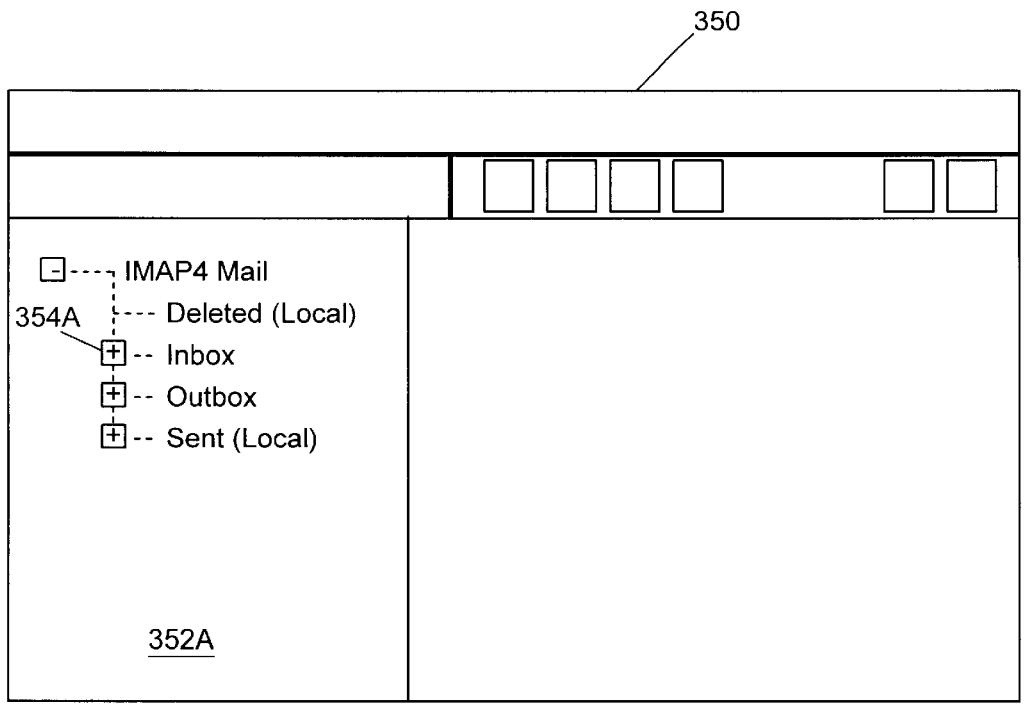
FIGS. 8A and 8B provide illustrations of a GUI message list view, which provides one manner of implicitly identifying folders to be synchronized.
Figure 8B:
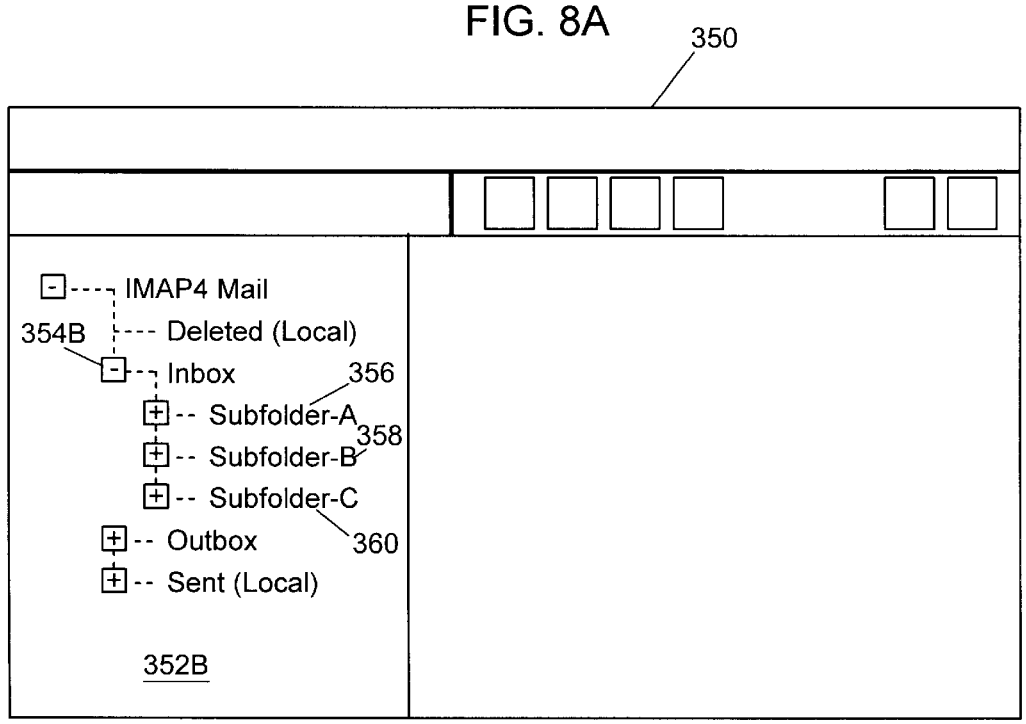
Figure 9:
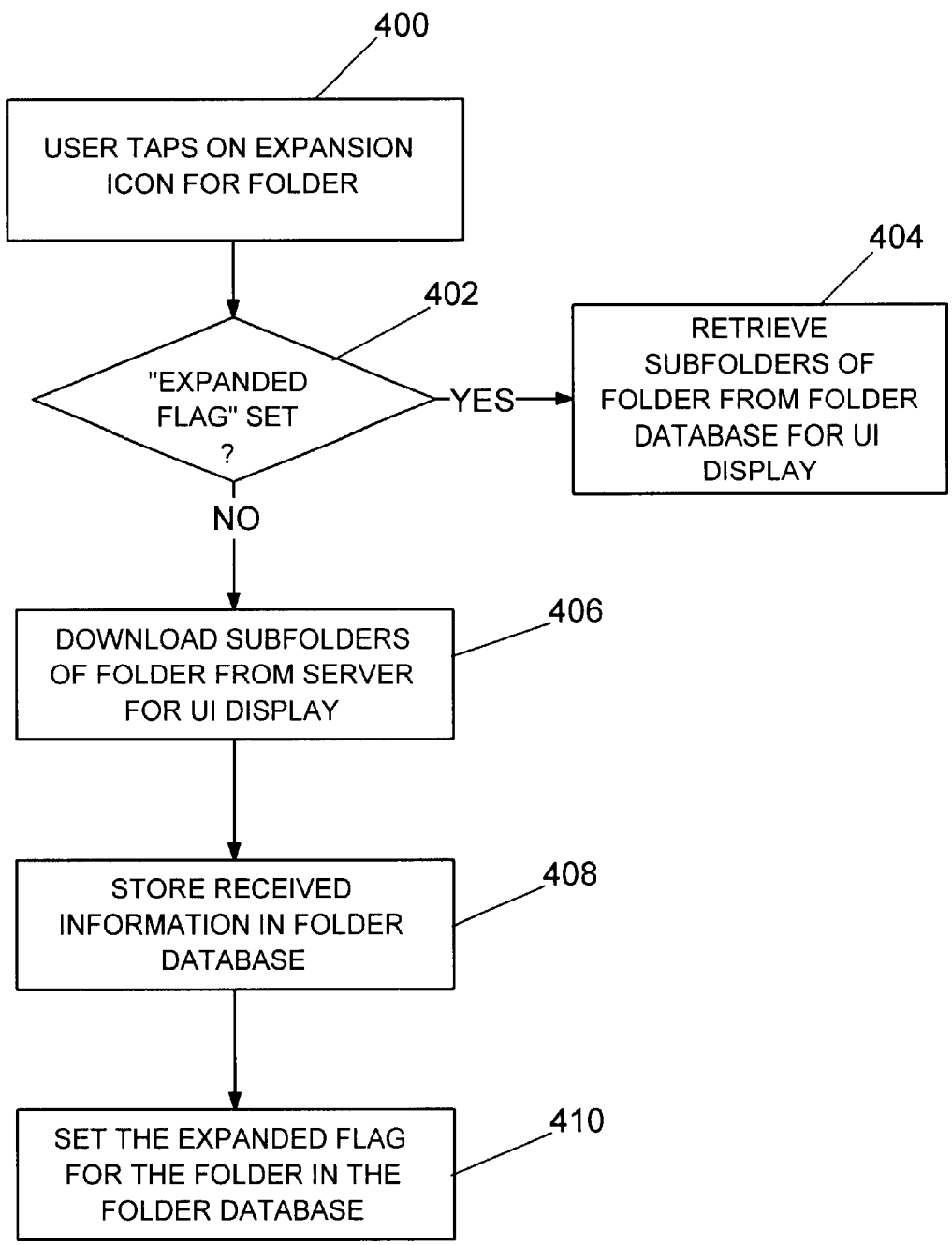
FIG. 9 illustrates logical operations for setting expansion flags, which designate items for synchronization in accordance with the present invention.

As previously indicated, the present invention provides for synchronization of a subset of folders in the folder hierarchy, based on the implicit perception of the user's need to synchronize that subset of folders. This is accomplished without the need for the user to explicitly designate which folders are to be synchronized. In the e-mail folder synchronization embodiment described above, folders are synchronized according to the state of the "expanded flag," which is an indicator as to whether subfolders of a particular folder should be synchronized or not. The expanded flag must therefore be set for those folders whose subfolders are to be synchronized, and a preferred embodiment of the present invention provides a manner of setting those expanded flag indicators without direct or explicit designation by the user. Rather, a preferred embodiment of the invention provides a manner of setting the indicators by ascertaining the user's implicit interest in certain folders, and if it appears that the user has an interest in the subfolders of a particular folder(s), the corresponding expanded flag(s) will be set. FIGS. 8A, 8B and 9, and the corresponding description thereof, set forth one manner of implicitly determining a user's interest in a subset of folders, which in turn sets the expanded flags and allows for synchronization of that folder subset in accordance with the principles of the present invention.

Referring now to FIG. 8A, an illustration of a graphical user interface (GUI) of a message list view is provided. It should be recognized that the following description is provided in terms of a GUI, those skilled in the art will readily appreciate from the ensuing description that other user interfaces are equally feasible, including text entry, voice activated input, touch screens, etc.

The message list view window 350 includes a folder pane 352A that provides the user with a view of the folder hierarchy on the H/PC. In this particular example, the Service Hierarchy Folder is referred to as "IMAP4 Mail," which includes four immediate subfolders including Deleted, Inbox, Outbox and Sent. As can be seen in the folder pane 352A, the IMAP4 Mail folder has been expanded to view its subfolders. This is evident from the [−] icon, hereinafter referred to as the "opened expansion icon." The Inbox, Outbox and Sent folders each include subfolders concealed from view, as evidenced from the [+] icon, hereinafter referred to as the "unopened expansion icon." No subfolders are associated with the Deleted folder as evidenced by the lack of any expansion icon.

When a user wants to view the subfolders of a particular folder, such as the Inbox folder, the unopened expansion icon 354A is selected by "tapping" or "clicking" on the icon 354A. By tapping on this icon, the user is implicitly showing an interest in the subfolders of the Inbox folder. Tapping this icon results in a folder pane 352B as shown in FIG. 8B. The icon associated with the Inbox folder changes from an unopened expansion icon to the opened expansion icon 354B, and the immediate subfolders of the Inbox folder are displayed to the user, namely, Subfolder-A 356, Subfolder-B 358 and Subfolder-C 360. As will be described further below, tapping the unopened expansion icon 354A not only causes the subfolders 356, 358 and 360 to be displayed, but also causes the expansion flag to be set for the Inbox. More particularly, the expansion flag field in the folder database for the record associated with the Inbox folder is set, thereby allowing subsequent synchronization of subfolders 356, 358 and 360. It should be noted that although each of the subfolders 356, 358 and 360 are associated with unopened expansion icons, no further subfolders of subfolders 356, 358 and 360 will be synchronized until their particular unopened expansion icons are tapped.

FIG. 9 is an operation flow diagram illustrating one embodiment in which the expansion flags are set in accordance with the present invention. The example of FIG. 9 is described in connection with the e-mail folder hierarchy embodiment. To initiate the operations, the user selects an unopened expansion icon for a folder, such as the unopened expansion icon 354A of FIG. 8A, and operation 400 receives the user selection. If the expanded flag is already set as determined at decision operation 402, the subfolders of that folder are retrieved from the folder database by operation 404 for user-interface (UI) display. If the expanded flag is not yet set, operation 406 downloads the subfolders of that folder from the server for UI display. Operation 408 stores the subfolders in the folder database. Set operation 410 sets the expanded flag for the folder in the folder database for future synchronizations. The operations described in connection with FIG. 9 occur when the H/PC is connected with the server.

If the H/PC is not connected with the server at the time the expansion icon is selected, the user must expand the folder upon connection to the server. In an alternative embodiment, if the H/PC is not connected with the server at the time the expansion icon is selected, steps 406–410 will occur automatically upon the next connection to the server. That is the H/PC remembers that the folder needs to be expanded upon the next connection to the server.

The operations of determining which particular subset of information is to be synchronized include a step of actually synchronizing that information between systems. For example, blocks 256 and 260 of FIG. 6, and block 312 of FIG. 7 set forth the step of actually synchronizing subfolders between the client and server. The present invention is not dependent on any particular manner of performing the actual synchronization between the two synchronizing systems, and the present invention may be implemented with any desired synchronizing algorithm. Therefore, while an exemplary information synchronization technique is described in connection with FIG. 10, those skilled in the art will readily appreciate that the present invention is clearly not limited to any particular synchronization operation.

Figure 10:
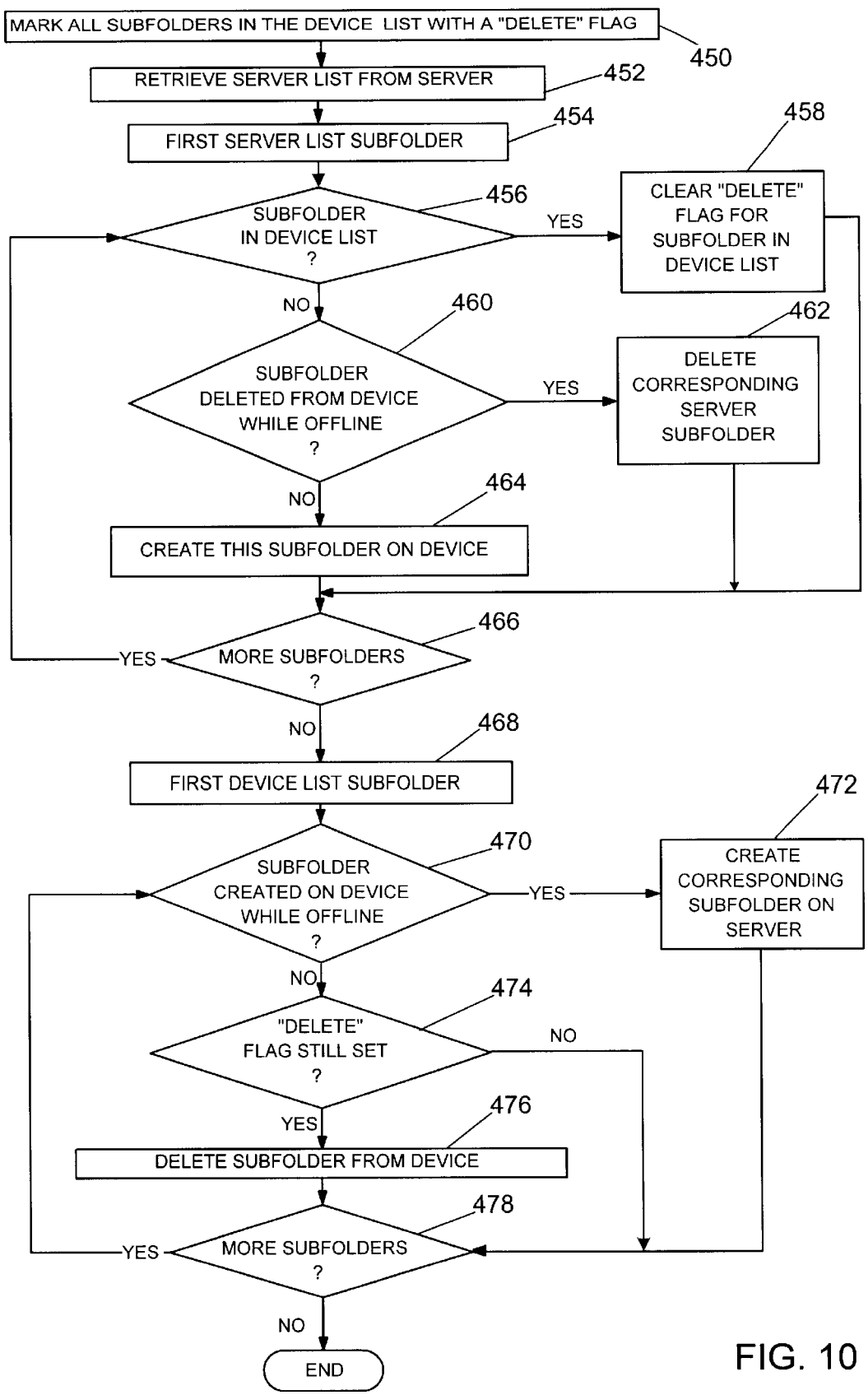
FIG. 10 is an operation flow diagram illustrating a manner in which portions of an e-mail folder hierarchy may be synchronized between multiple computing systems.

Referring now to FIG. 10, logical operations for synchronizing information, particularly an e-mail folder hierarchy, are illustrated. The synchronization operations synchronize subfolders of a particular folder; however they will do so only to the folders and subfolders designated in accordance with the principles of the present invention. In essence, the operations shown in FIG. 10 are executed for each folder, whose subfolders need to be synchronized. In this example, the synchronization operations work in connection with two subfolder lists of a particular folder—a server subfolder list, and a client subfolder list. The server list is the list of subfolders currently recognized by the server as being "children" of the folder in question. The client list is the list of subfolders currently recognized by the client/companion device as being "children" of the folder in question. The server and client lists correspond to stored records or objects, each potentially including a plurality of fields or properties, one of which is a "parent" identification in the case of folder objects. These objects are stored in an object store (i.e., mail store) in each respective computer system. The exemplary synchronization operation flow of FIG. 10 uses the server and client lists to determine folder/subfolder discrepancies between the systems, and synchronizes the lists accordingly. While the term "subfolders" is used in connection with FIG. 10, it should be noted that this term includes folders or subfolders.

The synchronization operations of FIG. 10 are carried out on the client. All subfolders in the client list are marked by mark operation 450 with an identifying flag, hereinafter referred to as the "delete flag." The delete flag provides an indication as to what subfolders were present in the device list at the outset of synchronization. As will become more apparent from the ensuing description, this flag is used to ultimately direct the client to delete a particular subfolder that has been deleted from the server since the last connection.

A server list synchronization loop is then performed. Retrieving operation 452 retrieves the server list from the server, wherein the server list is a list of subfolders for a particular folder as this operation is conducted on a folder to folder basis. In one embodiment, the top-level folder (e.g., Service Hierarchy Folder 200 of FIG. 5) does not exist on the server and only exists on the client, and therefore will not be "retrieved" from the server list. The subfolders associated with that particular service will exist on the server, and will be downloaded as part of the server list. A first subfolder of the server list is recognized by operation 454, and operation 456 determines whether that subfolder is in the client list. If so, operation 458 clears the delete flag in the client list. To "clear" the delete flag simply means to "unset" the delete flag that was initially set, and does not suggest or require any particular binary value or code. Any predetermined values may be used as to identify the "set" or "clear" conditions. Essentially, clearing the delete flag indicates that the server list subfolder is present on the client, and should not be deleted from the client because it is present on the server. Once the delete flag has been cleared in the client list, operation 466 detects whether there are more subfolders in the server list to consider, and if so, operation flow returns to decision operation 456 where the next subfolder in the device list is considered.

It should also be noted that discrepancies in subfolder names may be resolved at this point as well. Since each of the subfolders is identified by a subfolder ID rather than the descriptive UI name, the operation can identify corresponding subfolders in the server and device lists even though the UI names are different. In these cases, the subfolder name will be modified in accordance with a predetermined naming convention so that they correspond with one another. In one embodiment, this naming convention involves resolving name conflicts by adopting the subfolder name in the server list.

If operation 456 detects that the particular subfolder of the server list is not present in the client list, operation 460 determines whether that subfolder was deleted from the client while offline (i.e., not connected to the server) since the last connection. If so, that subfolder is deleted from the server list by operation 462, as deletion of the subfolder from the device indicates the user's desire to have that subfolder removed from the hierarchy. Once deleted, operation 466 detects whether there are more subfolders in the server list to consider, and if so, operation flow returns to decision operation 456 where the next subfolder in the client list is considered.

The fact that a device subfolder has been deleted while the device was offline is preferably indicated by a special "need to delete" flag. When the user deletes a folder while offline, it is not necessarily deleted at that time and is instead marked with the "need to delete" flag. Then, when constructing the client subfolder list for the parent of this folder, the folder is included into the list in order to match it up to a corresponding server folder. Following the match process, the folder is deleted along with the corresponding server folder during the next online session.

If the subfolder was not deleted from the client while offline, create operation 464 creates the subfolder on the client. A subfolder is created on the device at operation 464 because the subfolder is known to be present in the server list (i.e., operation 454 or 466), it is not present on the client (i.e., operation 456), and it was not deleted from the client since the last connection (i.e., operation 460). Therefore, to synchronize subfolders in the server and client lists, a corresponding subfolder must be created in the client list. Once created, operation 466 detects whether there are more subfolders in the server list to consider, and if so, processing returns to decision operation 456 where the next subfolder in the client list is considered.

A client list synchronization loop is then performed. A first subfolder of the client list is considered at operation 468, and operation 470 determines whether that subfolder was created on the client while offline since the last connection. When subfolders are created on the client while offline, they are marked with a special creation flag. This creation flag is checked at decision operation 470. If the creation flag indicates that the subfolder was created on the client while offline, operation 472 creates a corresponding subfolder on the server, after which the creation flag is cleared. Then, operation 478 determines whether there are more subfolders in the client list to consider. If so, processing returns to decision operation 470 where the next subfolder in the client list, if any, is considered.

If operation 470 determines that the subfolder was not created on the client while offline since the last connection, test operation 474 tests whether the "delete flag" is still set. If so, it means that subfolder was not previously found in the server list, and therefore needs to be deleted from the client, which is accomplished by operation 476. Operation 478 determines whether there are more subfolders in the client list to consider, and if so, processing returns to decision operation 470 where the next subfolder in the device list, if any, is considered.

The embodiments of the invention as presently described present techniques for synchronizing subsets of information between two systems, based on implicit perception of a user's need to synchronize such information and without the need for explicit designation by the user. The subsets of information, such as subfolders in a folder hierarchy, are ascertained by the invention through normal operations performed by the user rather than explicit designation. The information subsets are marked (in one embodiment, with expansion flags set on e-mail folders) to indicate that the particular information is to be synchronized. However, it may also be desirable to provide a manner of excluding from the synchronization process particular information previously marked for synchronization (in one embodiment, this corresponds to clearing or "unsetting" the expansion flags on certain folders). The description in connection with FIG. 11 therefore describes one embodiment of logical operations for removing folders/subfolders from synchronization.

Figure 11:
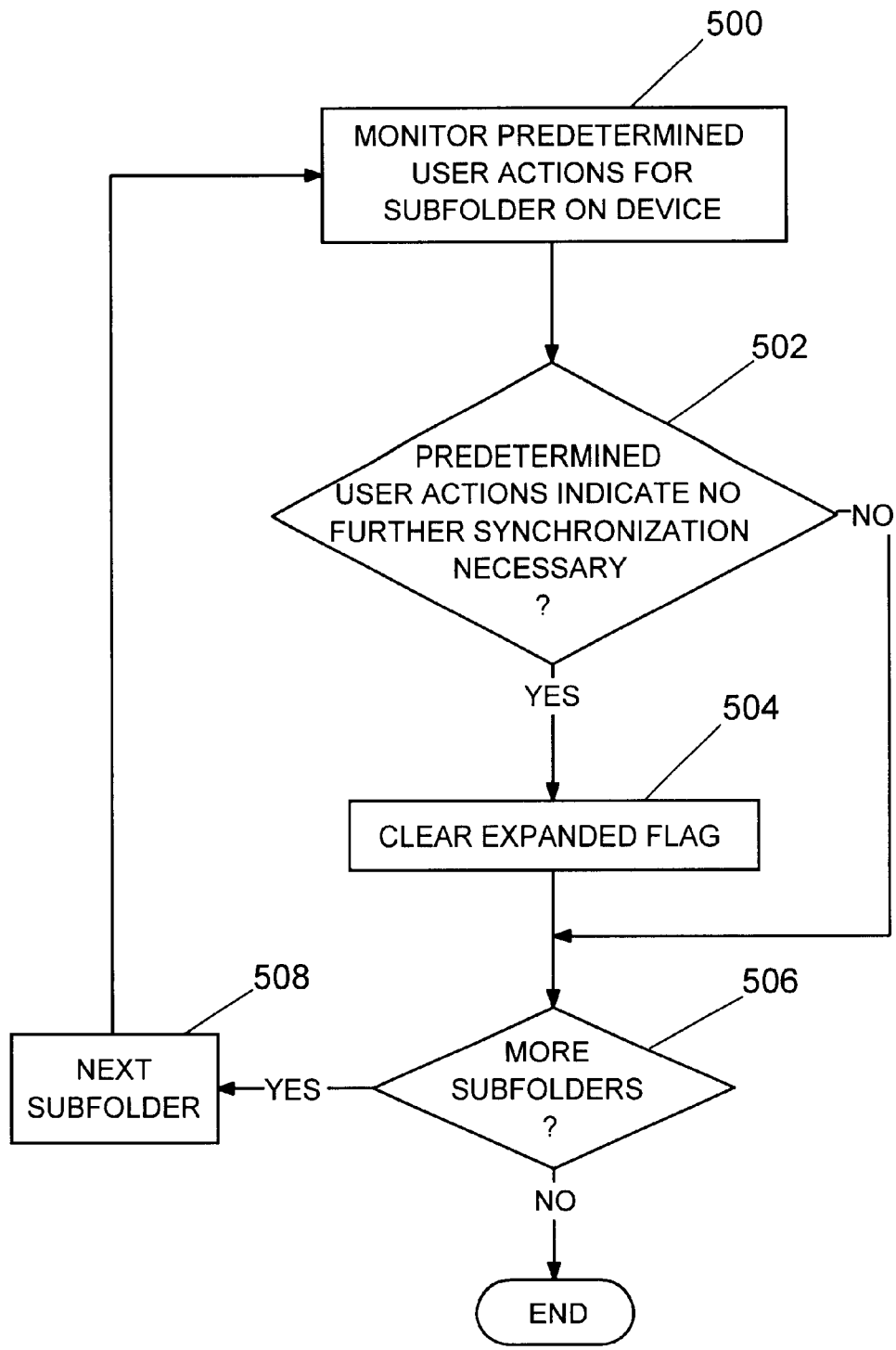
FIG. 11 shows one embodiment of logical operations for removing folders/subfolders from the synchronization process.

Referring now to FIG. 11, predetermined user actions for a particular subfolder on the device are monitored by monitor module 500. These "predetermined user actions" may include explicit or implicit designation by the user. For example, one implicit user action is the implicit lack of interest in a subfolder on the part of the user. This can be determined by measuring a period time during which that subfolder is never accessed by the user. More particularly, if a user does not view the subfolders of a particular folder for a predetermined time (e.g., days, weeks, etc.), it by implication shows the user's lack of interest in those subfolders, and synchronization of those subfolders may no longer be necessary or desirable. Another predetermined user action might be that a subfolder in which all associated messages have been deleted is assumed to be unimportant to the user, and synchronization of that subfolder becomes unnecessary. In another example, a user may be provided with a GUI screen or other UI methodology to explicitly select subfolders that are to be excluded from the synchronization process.

If operation 502 determines that the chosen predetermined user action(s) is recognized, which indicates that no further synchronization is necessary, operation 504 clears, "unsets," or otherwise disassociates the expanded flag from that subfolder so that the subfolder will no longer be synchronized. Decision operation 506 then determines if there are more subfolders to be considered, and if so, the next subfolder is considered by operation 508, and processing returns to monitor module 500 where the predetermined user actions are again monitored for that particular subfolder.

It will, of course, be understood that various modifications and additions can be made to the embodiments discussed hereinabove without departing from the scope or spirit of the present invention. For example, the present invention may be implemented in an operating system such as Microsoft Corporation's "WINDOWS CE", or may be implemented in other operating systems or application software such as an e-mail software module. While many embodiments of the invention were described in terms of synchronization of e-mail folder hierarchies, the invention is not limited to such, as the implicit determination of a user's interest in other synchronizable information (such as file directories, task categories, notes, contacts, and other categories of information) can be similarly determined using the principles of the present invention. Further, the particular embodiments relating to an e-mail hierarchy are not limited to IMAP, POP or any other transport protocol described above, but rather the principles of the present invention described in connection with folder hierarchy embodiments are applicable to any transport protocol supporting multiple folders or folder hierarchies. Accordingly, the scope of the present invention should not be limited by the particular embodiments discussed above, but should be defined only by the claims set forth below and equivalents thereof.

What is claimed is:

1. A method for synchronizing subsets of an object set between first and second object stores in first and second computing systems respectively, the method comprising:

defining one or more predetermined user actions that implicitly demonstrate a user's desire to synchronize particular objects of the object set between the first and second object stores;

assigning a synchronization indicator to each of the particular objects to be synchronized in the second object store, upon recognition of the predetermined user action;

disassociating the synchronization indicator from objects in the second object store which are no longer to be included in the subset of objects to be synchronized based on a use pattern of the user, wherein the use pattern of the user is based upon a lack of use of the object for a predetermined time duration; and synchronizing the subset of objects to which the synchronization indicator has been assigned in the second object store.

2. A method for synchronizing subsets of an e-mail folder hierarchy between a server computer and a client computer, the method comprising:

defining one or more predetermined user actions that implicitly demonstrate a user's desire to synchronize particular folders of the e-mail folder hierarchy between the server and client computers;

associating a synchronization flag in the client computer with parents of folders to be synchronized upon recognition of the predetermined user action;

disassociating the synchronization flag from parent folders of the currently-synchronized folders which are no longer to be included in the subset of folders to be synchronized;

wherein disassociating the synchronization flag comprises disassociating the synchronization flag based on a use pattern of the user, wherein the use pattern is based on the user's failure to activate a folder expansion feature for a currently synchronized folder for a predetermined time duration; and synchronizing the subfolders of folders associated with the synchronization flags in the client computer, whereby synchronization of the subset of folders is accomplished without explicit designation of the subset by the user.

* * * * *